(12) United States Patent
Takahashi (10) Patent No.: US 7,826,328 B2
(45) Date of Patent: Nov. 2, 2010

(54) OPTICAL PICKUP DEVICE AND OPTICAL DISK APPARATUS USING THE SAME

(75) Inventor: Toyokazu Takahashi, Tokyo (JP)

(73) Assignee: Sony Corporation, Tokyo (JP)

( * ) Notice: Subject to any disclaimer, the term of this patent is extended or adjusted under 35 U.S.C. 154(b) by 532 days.

(21) Appl. No.: 11/836,260

(22) Filed: Aug. 9, 2007

(65) Prior Publication Data

US 2008/0062848 A1    Mar. 13, 2008

(30) Foreign Application Priority Data

Sep. 8, 2006    (JP) .............................. 2006-244754

(51) Int. Cl.
*G11B 7/00* (2006.01)
(52) U.S. Cl. .............................. 369/112.01; 369/112.23
(58) Field of Classification Search ................. None
See application file for complete search history.

(56) References Cited

U.S. PATENT DOCUMENTS 5,684,641 A * 11/1997 Tanaka et al. ................ 359/719
2004/0150892 A1   8/2004 Takeuchi et al.

FOREIGN PATENT DOCUMENTS

JP    2004-247034    9/2004

* cited by examiner

*Primary Examiner*—Joseph H Feild
*Assistant Examiner*—Tawfik Goma
(74) *Attorney, Agent, or Firm*—Oblon, Spivak, McClelland, Maier & Neustadt, L.L.P.

(57) ABSTRACT

An optical pickup device includes: a light source that emits a light beam; a divergence-angle converting lens that converts an angle of divergence of the light beam emitted from the light source and emits the light beam; and an object lens displaceable in a tracking direction that receives incidence of the light beam, the angle of divergence of which is converted by the divergence-angle converting lens, and converges and emits the light beam, wherein spherical aberration equivalent to an amount that can offset astigmatism caused when the object lens is displaced is given to the divergence-angle converting leans, and spherical aberration that can offset the spherical aberration given to the divergence-angle converting leans is given to the object lens and comatic aberration that can offset comatic aberration caused by the spherical aberration given to the divergence-angle converting lens when the object lens is displaced is given to the object lens.

3 Claims, 8 Drawing Sheets

OPTICAL PICKUP DEVICE AND OPTICAL DISK APPARATUS USING THE SAME

CROSS-REFERENCES TO RELATED APPLICATIONS

The present invention contains subject matter related to Japanese Patent Application JP 2006-244754 filed in the Japanese Patent Office on Sep. 8, 2006, the entire contents of which being incorporated herein by reference.

BACKGROUND OF THE INVENTION

1. Field of the Invention

The present invention relates to an optical pickup device used for recording an information signal on an optical disk and reproducing the information signal recorded on the optical disk and an optical disk apparatus using the optical pickup device.

2. Description of the Related Art

There has been used an optical pickup device that records an information signal on and/or reproduces the information signal from optical disks such as a CD (Compact Disc) and a DVD (Digital Versatile Disc) and optical disks that make it possible to perform high-density recording.

Such an optical pickup device is desired to be reduced in size and simplified to be applicable to various uses. The reduction in size and the simplification of the optical pickup device can be realized by setting a total track length of an optical system short, i.e., setting a total length of the optical system short.

The total track length of the optical pickup device mainly depends on a media standard of an optical disk, on which an information signal is recorded and from which the information signal is reproduced, and a characteristic of an angle of divergence of a semiconductor laser used by the optical pickup device. The optical pickup device of the past converts a light beam emitted at a predetermined angle of divergence from a light source such as a semiconductor laser into parallel light using a collimator lens. The optical pickup device condenses the light beam, which is converted into the parallel light, on the optical disk using an object lens having a predetermined numerical aperture to form a spot.

In the optical pickup device of such a structure, when a media standard is determined, a numerical aperture of the object lens dependent on a spot size and RIM intensity of a light beam made incident on the object lens are determined. The RIM intensity is a ratio of intensity in the outer periphery to intensity in the center of the object lens.

On the other hand, in order to use an area of an appropriate intensity distribution with respect to the angle of divergence of the semiconductor laser, a focal length of the collimator lens is determined. Consequently, a magnification of the optical system of the optical pickup device is determined and, at the same time, the total track length is restricted by focal lengths of the object lens and the collimator lens.

It is possible to secure predetermined RIM intensity of the light beam made incident to the object lens and set the total track length, which is determined by the restriction, short by using an divergence-angle converting leans that converts an angle of divergence of a light beam emitted from the light source rather than using the collimator lens.

Specifically, the divergence-angle converting lens has an optical arrangement of a retro-focus type that can diverge the light beam emitted from the light source at a larger angle of divergence when the light beam is made incident on a first surface on an incidence side of the lens and emit the light beam at a predetermined angle of divergence when the light beam is emitted from a second surface on an emission side of the lens. Moreover, the divergence-angle converting lens is formed by combining object lenses having finite magnifications corresponding to the lens. Therefore, it is possible to set the total track length short while securing the predetermined RIM intensity and the predetermined numerical aperture.

However, usually, when the object lens and the divergence-angle converting lens are designed under an aplanat condition without a spherical aberration and a comatic aberration to form an optical pickup device, astigmatism occurs when the object lens shakes a visual field thereof. When the total track length is set short as described above, an amount of astigmatism amount caused when the visual field is shaken increases and significantly affects signal detection.

As a related art, there is JP-A-2004-2478034.

SUMMARY OF THE INVENTION

Therefore, it is desirable to provide an optical pickup device that can be reduced in size by setting a total track length short in a state in which an optical characteristic is maintained.

According to an embodiment of the present invention, there is provided an optical pickup device including a light source that emits a light beam, a divergence-angle converting lens that converts an angle of divergence of the light beam emitted from the light source and emits the light beam, and an object lens adapted to be displaceable in a tracking direction that receives incidence of the light beam, the angle of divergence of which is converted by the divergence-angle converting lens, and converges and emits the light beam. Spherical aberration equivalent to an amount that can offset astigmatism caused when the object lens is displaced is given to the divergence-angle converting leans. Spherical aberration that can offset the spherical aberration given to the divergence-angle converting leans is given to the object lens. Comatic aberration that can offset comatic aberration caused by the spherical aberration given to the divergence-angle converting lens when the object lens is displaced is given to the object lens.

According to another embodiment of the present invention, there is provided an optical disk apparatus including an optical pickup device that records an information signal on and reproduces the information signal from an optical recording medium. The optical pickup device described above is used as an optical pickup device used in the optical disk apparatus.

In the optical pickup device and the optical disk apparatus according to the embodiments of the present invention, it is possible to set a total track length short compared with an infinite optical system in a state in which an optical characteristic is maintained and a reduction in size of the apparatus is realized.

DESCRIPTION OF THE PREFERRED EMBODIMENTS

An optical pickup device and an optical disk apparatus using the optical pickup device according to an embodiment of the present invention will be hereinafter explained with reference to the accompanying drawings.

The optical pickup device 1 according to this embodiment records information on and reproduces information from an optical disk 2. The optical pickup device 1 constitutes the optical disk apparatus together with a spindle motor as driving means for rotating the optical disk 2, a feed motor that moves the optical pickup device 1 in a radial direction of the optical disk 2, and the like. The optical pickup device 1 records information on and reproduces information from the optical disk 2 rotated by the spindle motor.

The optical disk 2 used for recording and reproduction of information is an optical disk such as a CD (Compact Disc), a DVD (Digital Versatile Disc), a CD-R (Recordable) and a DVD-R (Recordable) on which information is recordable, a CD-RW (ReWritable), a DVD-RW (ReWritable), and a DVD+RW (ReWritable) on which information is rewritable, a DVD-RAM (Random Access Memory), a high-density recording optical disk capable of performing high-density recording using a semiconductor laser with a shorter light-emitting wavelength of about 405 nm (blue purple), a magneto-optical disk, or the like.

Figure 1:
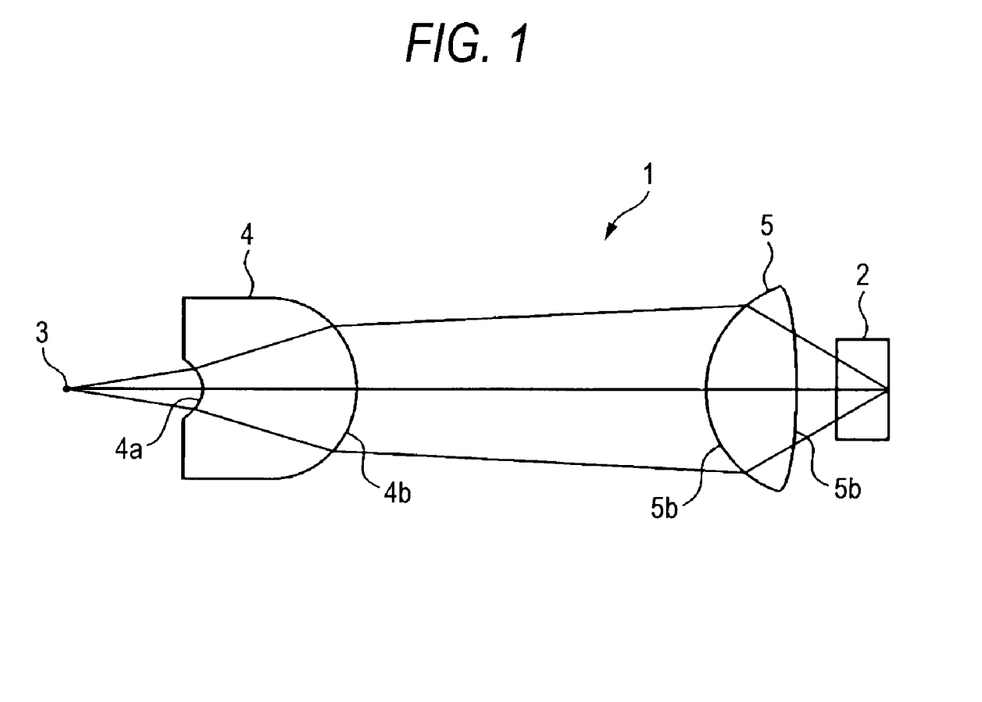
FIG. 1 is an optical path diagram showing an optical system of an optical pickup device according to an embodiment of the present invention.

The optical pickup device 1 according to this embodiment includes, as shown in FIG. 1, a light source 3 that emits a light beam having a predetermined wavelength, a coupling lens 4 as a divergence-angle converting lens that converts an angle of divergence of the light beam emitted from the light source 3 to be a predetermined angle of divergence, an object lens 5 that condenses the light beam, the angle of divergence of which is converted by the coupling lens 4, on a signal recording surface of the optical disk 2, and a not-shown photodetector that detects the return light beam reflected by the optical disk 2.

The optical pickup device 1 drives, on the basis of a tracking error signal and a focus error signal generated by the return light detected by the photodetector, the object lens 5 in a tracking direction and a focus direction to perform tracking servo and focus servo. When the object lens 5 is driven, the object lens 5 is moved to a focus position where the light beam is focused on the signal recording surface of the optical disk 2. The light beam is focused on the signal recording surface of the optical disk 2 to record information on and reproduces information from the optical disk 2.

The coupling lens 4 as the divergence-angle converting lens and the object lens 5, which constitute the optical pickup device 1, will be explained.

The coupling lens 4 is an element that converts an angle of divergence to convert a light beam made incident thereon from the light source 3 into a light beam in a nonparallel state and has a so-called finite magnification. The object lens 5 has the finite magnification corresponding to the coupling lens 4.

The coupling lens 4 is an optical element of a so-called retro-focus type that can diverge the light beam emitted from the light source 3 at a larger angle of divergence when the light beam is made incident on a surface on an incidence side of the lens, and emits the light beam at a predetermined angle of divergence when the light beam is emitted from a surface on an emission side of the lens.

An optical system of the optical pickup device 1 that has the coupling lens 4 and the object lens 5 described above is a so-called finite optical system. In the optical system, compared with an infinite optical system that uses a collimator lens and the like, a total track length (hereinafter also referred to as "TT length"), which is a total length of the optical system, can be set short. The total track length is, in other words, a distance between an object point and an image point.

The coupling lens 4 and the object lens 5 are formed under a non-aplanat condition. An aplanat condition means a condition under which spherical aberration and comatic aberration do not occur. The non-aplanat condition means a condition under which spherical aberration, comatic aberration, or both the spherical aberration and the comatic aberration are given to the aplanat condition.

Spherical aberration equivalent to an amount that can offset astigmatism caused in the case of so-called visual field shake in which the object lens 5 is displaced in the tracking direction is given to the coupling lens 4. The visual field shake means displacing the object lens 5 to displace the image point.

On the other hand, spherical aberration that can offset the spherical aberration given to the coupling lens 4 is given to the object lens 5. In addition, comatic aberration that can offset comatic aberration caused by the spherical aberration given to the coupling lens 4 and the spherical aberration given to the object lens 5 itself in the case of visual field shake is given to the object lens 5.

Here, the spherical aberration, the astigmatism, and the comatic aberration means values converted into a spherical aberration component, an astigmatism component, and a comatic aberration component when a wave front is subjected to Zernike expansion.

A first surface 4a on the incidence side and a second surface 4b on the emission side of the coupling lens 4 are formed in an aspherical shape. A third surface 5a on the incidence side and a fourth surface 5b on the emission side of the object lens 5 are formed in an aspherical shape. Consequently, predetermined aberration is given to the coupling lens 4 and the object lens 5. Here, the aspherical shapes of the coupling lens 4 and the object lens 5 are given by the following Equation (1). In Equation (1), h represents a distance (mm) from an optical axis, R represents a curvature radius (mm), Z(h) represents a distance from a contact plane at a surface vertex in a position of the distance h from the optical axis, K represents a conical constant, and Ai represents an aspherical constant.

$$Z(h) = \frac{h^2/R}{1 + \sqrt{1 - (1+K)h^2/R^2}} + \sum_{i=2} A_i h^i \quad (1)$$

An optical design method of designing the coupling lens 4 and the object lens 5 described above will be hereinafter explained with reference to FIGS. 2 to 4.

The optical design method of designing the coupling lens 4 and the object lens 5 includes step 1 of calculating, in an optical system including a coupling lens and an object lens having finite magnification, spherical aberration given to the coupling lens to prevent astigmatism from being caused when visual field shake occurs, step 2 of calculating spherical aberration given to the object lens to offset spherical aberration caused by the coupling lens given with the spherical aberration, and step 3 of calculating, in the optical system including the coupling lens given with the spherical aberration and the object lens given with the spherical aberration, comatic aberration given to the object lens to prevent comatic aberration from being caused when visual field shake occurs.

Figure 2:
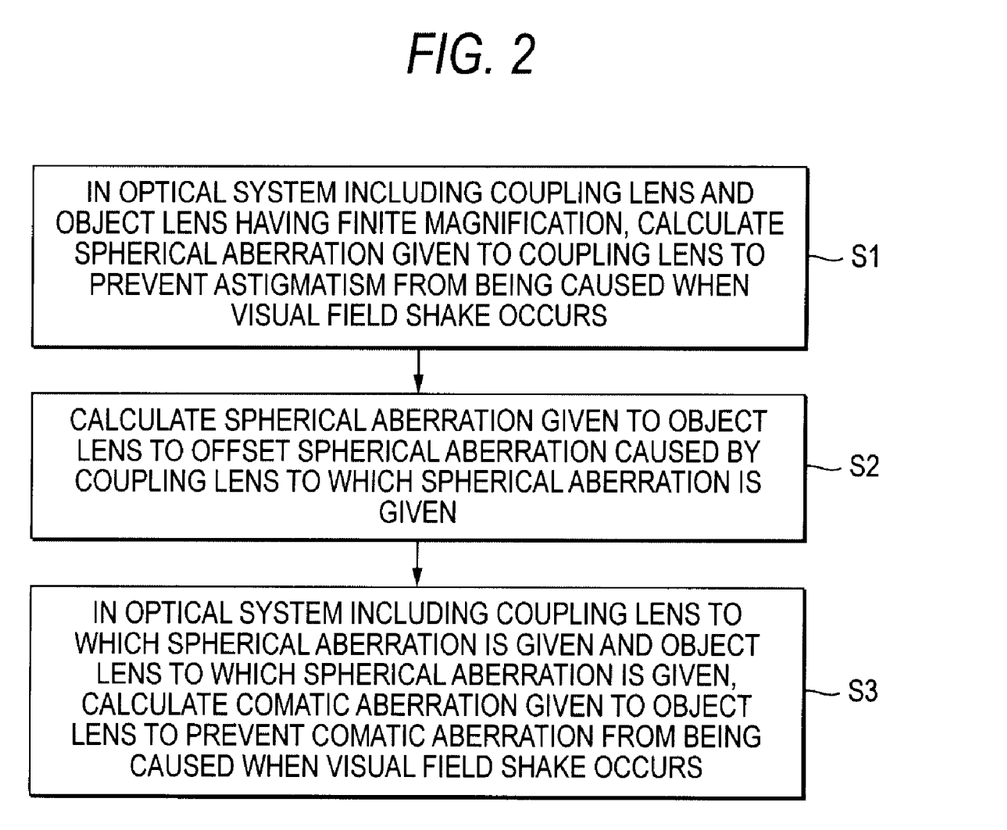
FIG. 2 is a flowchart showing an optical design method of designing a divergence-angle converting lens and an object lens constituting the optical pickup device according to the embodiment.
Figure 3:
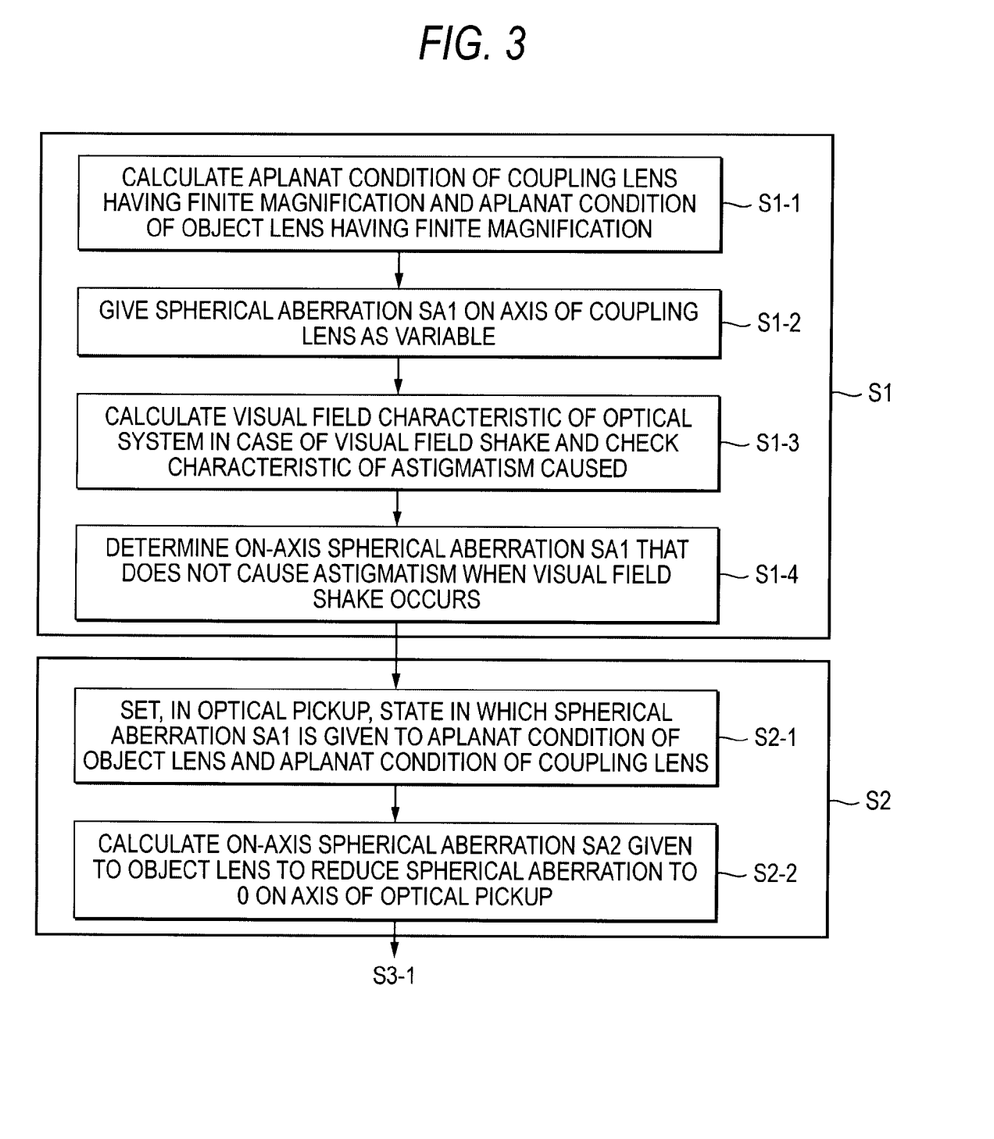
FIG. 3 is a more detailed flowchart of step 1 and step 2 of the optical design method shown in FIG. 2.

Step 1 has, as shown in FIGS. 2 and 3, step 1-1 of calculating, in the optical system including the object lens and the coupling lens, an aplanat condition of the coupling lens having the finite magnification and an aplanat condition of the object lens having the finite magnification, step 1-2 of giving spherical aberration SA1 on an axis of the coupling lens as a variable, step 1-3 of calculating a visual field characteristic of the optical system in which the object lens is displaced in a tracking direction in the case of visual field shake and checking a characteristic of astigmatism (AS) caused, and step 1-4 of determining, by repeating steps 1-2 and 1-3, on-axis spherical aberration SA1 that does not cause off-axis astigmatism when visual field shake occurs.

In step 1-1, the coupling lens and the object lens having the finite magnification are calculated by aplanatic design without spherical aberration and comatic aberration.

Figure 5:
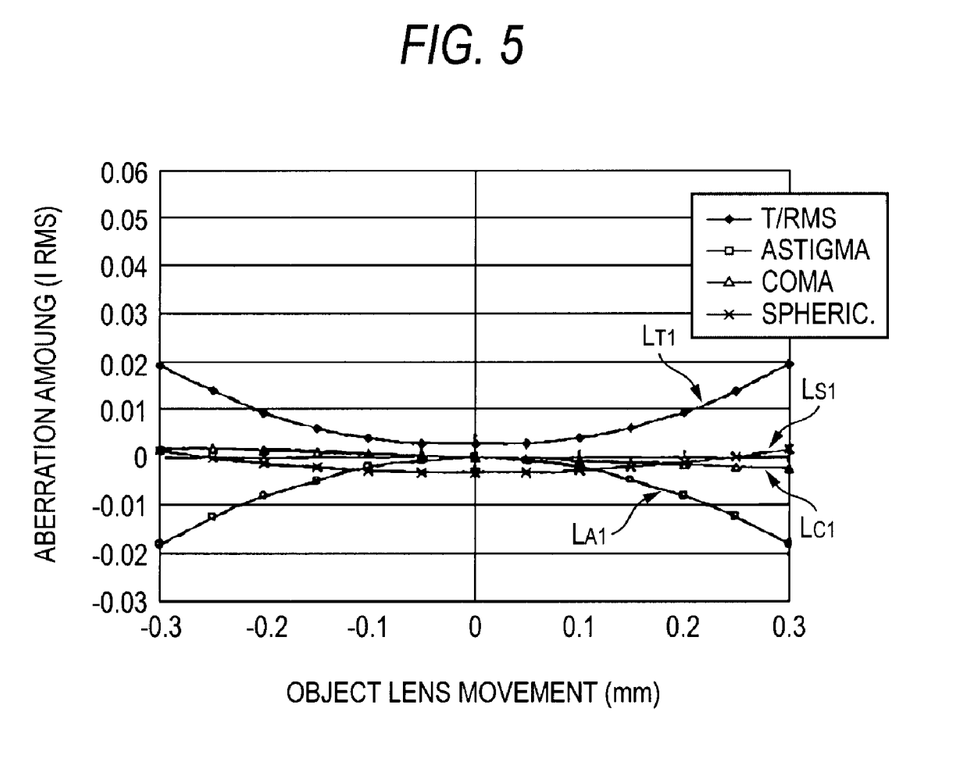
FIG. 5 is a diagram showing a result obtained by calculating a visual field characteristic when an aplanat object lens having a finite magnification and an aplanat coupling lens having the finite magnification are combined as an optical pickup device.
Figure 6:
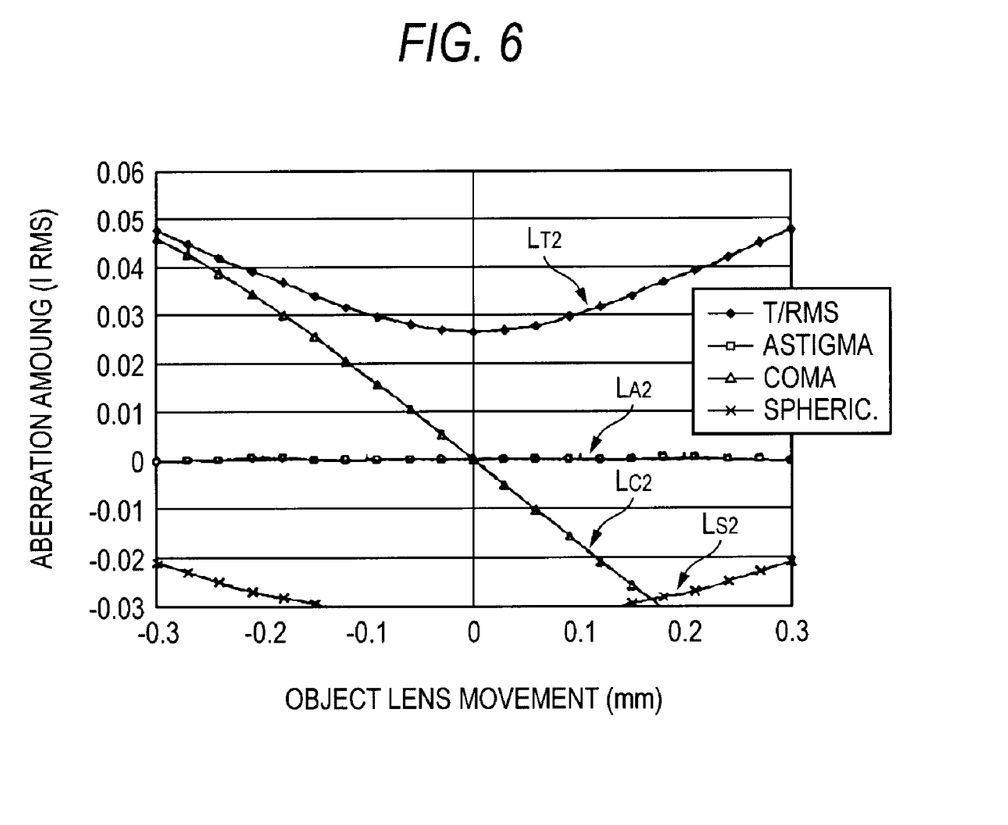
FIG. 6 is a diagram showing a result obtained by calculating a visual field characteristic when an aplanat object lens and a coupling lens given with determined spherical aberration are combined as an optical pickup device.
Figure 8:
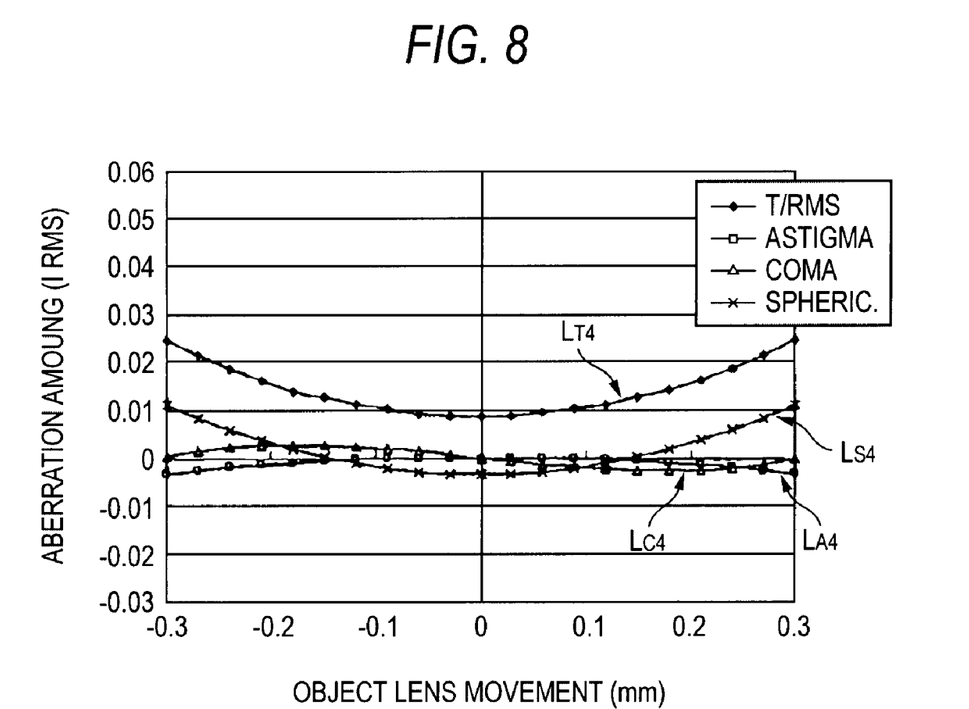
FIG. 8 is a diagram showing a result obtained by calculating a visual field characteristic when an object lens given with spherical aberration and an object lens given with spherical aberration and comatic aberration are combined as an optical pickup device.

A result obtained by calculating a visual field characteristic when the aplanat object lens having the finite magnification and the aplanat coupling lens having the finite magnification calculated in step 1-1 are combined as an optical pickup device is shown in FIG. 5. In FIG. 5, FIGS. 6 and 8 described later, the abscissa represents an object lens movement (mm) and the ordinate represents an aberration amount (λRMS). In the respective figures, LA1, LA2, and LA4 represent astigmatism (Astigma), LC1, LC2, and LC4 represent comatic aberration (Coma), LS1, LS2, and LS4 represent spherical aberration (Spheric.), and LT1, LT2, and LT4 represent wave front aberration (T/RMS). As shown in FIG. 5, when a visual field of the object lens changes, third-order astigmatism occurs.

In step 1-2, since a fourth-order aspherical coefficient (A) is given to the first surface and the second surface of the coupling lens as a variable, the spherical aberration SA1 on the axis fluctuates according to this coefficient.

In step 1-4, since the fourth-order aspherical aberration (A) is determined as a variable in a so-called AS free state in which off-axis astigmatism does not occur when visual field shake of the object lens occurs, the on-axis spherical aberration SA1 given to the coupling lens is determined. A result of a visual field characteristic obtained when the spherical aberration SA1 is determined in step 1-4 is shown in FIG. 6. As shown in FIG. 6, since the aspherical aberration SA1 is given, it is possible to prevent occurrence of astigmatism in the case of visual field shake.

Step 2 has, as shown in FIGS. 2 and 3, step 2-1 of setting, in the optical pickup device, a state in which the spherical aberration SA1 determined in step 1-4 is given to the aplanat condition of the object lens and the aplanat condition of the coupling lens and step 2-2 of calculating on-axis spherical aberration SA2 to be given to the object lens to reduce the third-order spherical aberration to 0 on the axis of the optical pickup device set in step 2-1.

In step 2-2, the fourth-order aspherical surface coefficient (A2) of the first surface or the second surface of the object leans is changed to reduce the third-order spherical aberration on the axis of the optical pickup device to 0 and the spherical aberration SA2 to be given to the object lens is calculated.

Figure 4:
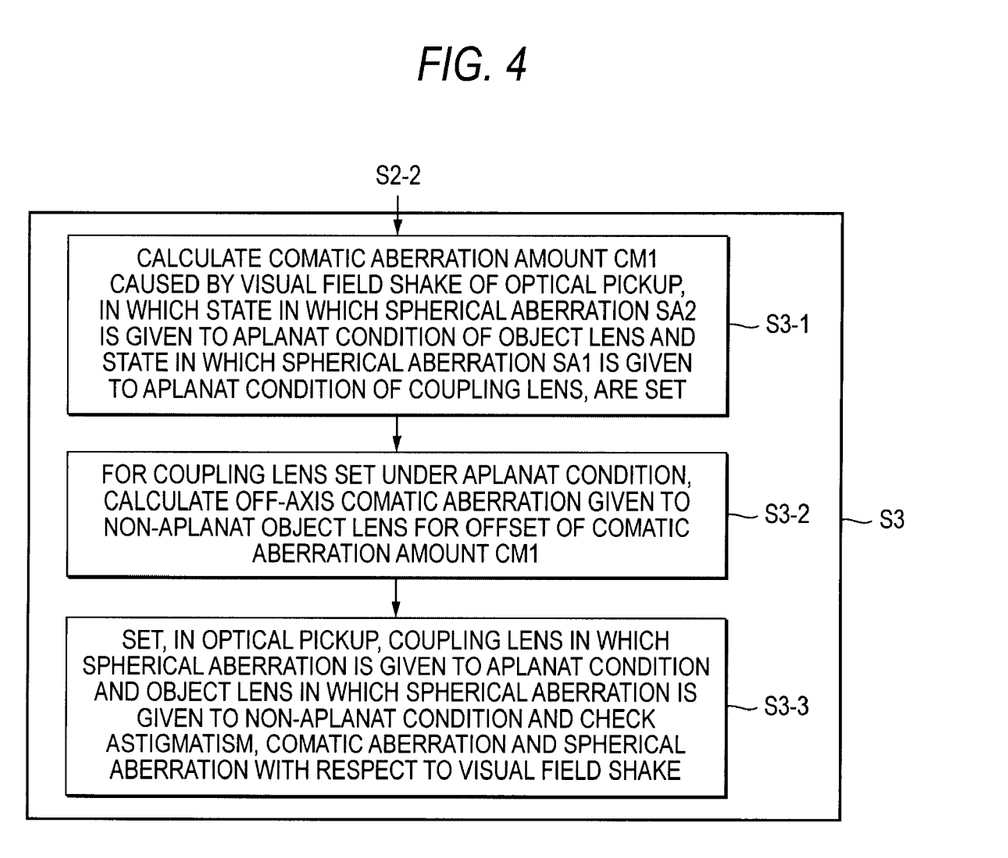
FIG. 4 is a more detailed flowchart of step 3 of the optical design method shown in FIG. 2.

Step 3 has, as shown in FIGS. 2 and 4, step 3-1 of calculating a comatic aberration amount CM1 caused by visual field shake of the optical pickup device, in which a state in which the spherical aberration SA2 calculated in step 2-2 is given to the aplanat condition of the object lens and a state in which the spherical aberration SA1 determined in step 1-4 is given to the aplanat condition of the coupling lens, are set, step 3-2 of calculating, for the coupling lens set under the aplanat condition of the finite magnification used in step 1-1, off-axis predetermined comatic aberration CM2, which is given to the object lens to change the object lens to a non-aplanat object lens, for offsetting the comatic aberration amount CM caused in a visual field of 0.3 mm obtained in step 3-1, and step 3-3 of setting, in the optical pickup device, the coupling lens in which the spherical aberration SA1 is given to the aplanat condition and the object lens in which the spherical aberration SA2 is given to the non-aplanat condition calculated in step 3-2 and checking astigmatism (AS), comatic aberration (CM), and spherical aberration (SA) with respect to the visual field shake.

In step 3-1, a visual field characteristic of the optical pickup device set as described above is calculated, and a comatic aberration amount caused by eccentricity of the on-axis spherical aberration SA1 given to the coupling lens and the on-axis spherical aberration SA2 given to the object lens is calculated. For example, a comatic aberration amount in the visual field of 0.3 mm is calculated.

In step 3-2, the comatic aberration CM2 given off-axis to change the object lens to a non-aplanat object lens for obtaining the comatic aberration CM1 caused in the visual field of 0.3 mm obtained in step 3-1 is calculated. Giving the comatic aberration CM2 to the object lens means that the predetermined comatic aberration CM2 for offsetting the comatic aberration CM1 is caused to set the object lens under the non-aplanat condition.

Figure 7:
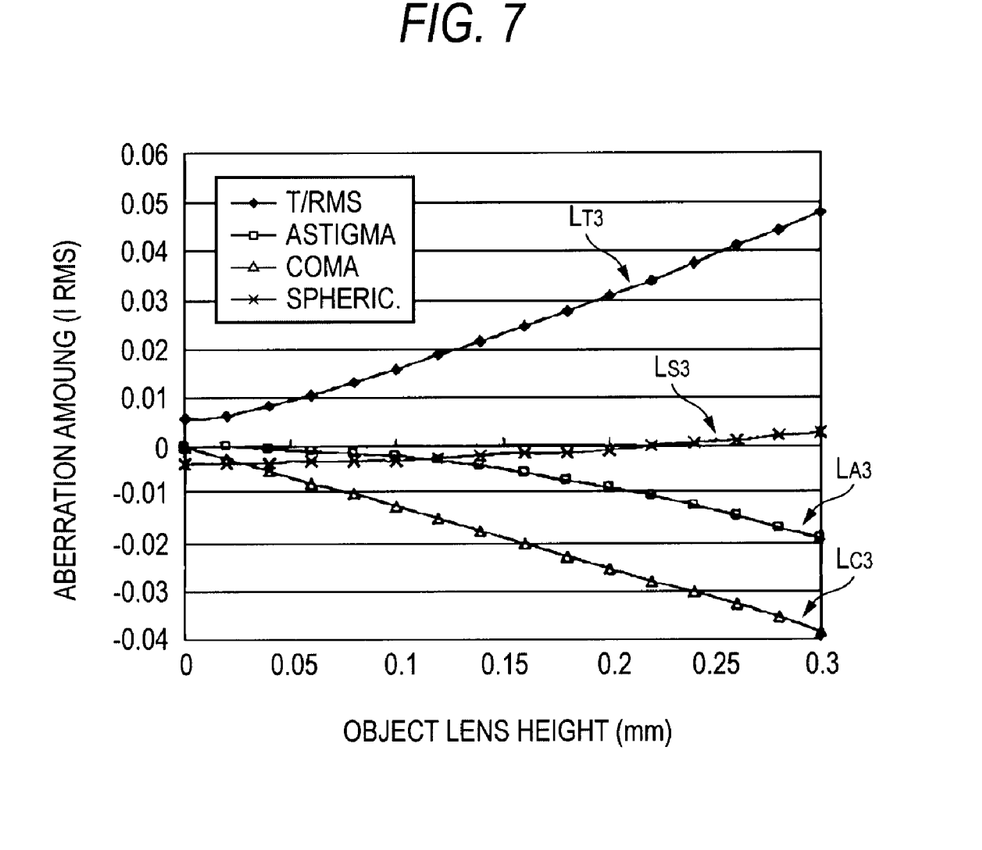
FIG. 7 is a diagram showing a result obtained by calculating an object height characteristic when an object lens given with comatic aberration and set under a non-aplanat condition and an aplanat coupling lens are combined as an optical pickup device.

A result obtained by calculating an object height characteristic when the object lens given with the comatic aberration CM2, which is obtained in 3-2, and set under the non-aplanat condition and the coupling lens of the aplanat magnification set under the aplanat condition are combined as the optical pickup device is shown in FIG. 7. In other words, FIG. 7 is a characteristic chart showing changes in respective kinds of aberration at the time when an object height is changed. In FIG. 7, the abscissa represents an object height (mm) and the ordinate represents an aberration amount (λRMS). In FIG. 7, LA3 represents astigmatism (Astigma), LC3 represents comatic aberration (Coma), LS3 represents spherical aberration (Spheric.), and LT3 represents wave front aberration (T/RMS). As shown in FIG. 7, it is possible to confirm that the desired comatic aberration CM2 is given. In this example, the comatic aberration CM1 that should be offset is 0.0430 λRMS (a position of 0.3 mm) and the comatic aberration CM2 for offsetting the comatic aberration CM1 is obtained.

A result obtained by calculating a visual field characteristic when the coupling lens given with the spherical aberration and set to be non-aplanat and the object lens given with the spherical aberration and the comatic aberration and set to be non-aplanat are combined as the optical pickup device in step 3 is shown in FIG. 8. In FIG. 8, the abscissa represents an object lens movement (mm) and the ordinate represents an aberration amount (λRMS). As shown in FIG. 8, even if a visual field of the object lens changes, it is possible to reduce the third-order astigmatism and the third-order comatic aberration to the limit and it is possible to sufficiently reduce the third-order spherical aberration.

According to the optical design method including steps 1-1 to 3-3 described above, it is possible to form the coupling lens 4 given with the spherical aberration SA1 equivalent to an amount that can offset astigmatism caused when the object lens is displaced. It is possible to form the object lens 5 given with the spherical aberration SA2 that can offset the spherical aberration SA1 given to the coupling lens 4 and given with the comatic aberration CM2 that can offset the comatic aberration CM1 that occurs in the case of visual field shake because of the spherical aberration SA1 given to the coupling lens 4 when the object lens 5 is displaced and the spherical aberration given to the object lens 5 itself.

Such an optical design method is a method of artificially setting the object lens and the divergence-angle converting lens (the coupling lens) to be non-aplanat to keep a balance of optical aberration each other. Therefore, with the optical design method, visual field characteristics of the object lens and the divergence-angle converting lens formed as finite optical systems are improved.

An example of the non-aplanat object lens and the non-aplanat coupling lens obtained according to the optical design method explained with reference to FIGS. 2 to 4 is shown in Tables 1 to 3. Table 1 shows curvature radiuses (R), surface intervals, and glass material refractive indexes of the object lens and the coupling lens. In Table 1, cover glass and the like in a light source are omitted. Table 2 shows aspherical coefficients (Ai) of the object lens and the coupling lens. Table 3 shows total track lengths (TT lengths) (distances between a light-emitting point and a condensing point), magnifications, and focal lengths of the object lens, the coupling lens, and the optical pickup device obtained by combining the object lens and the coupling lens. In obtaining this example, the on-axis third-order spherical aberration SA1 obtained in step 1-4 is −0.0639 λRMS, the on-axis third-order spherical aberration SA2 obtained in step 2-2 is 0.0639 λRMS, and the comatic aberration CM1, which should be offset, obtained in step 3-1 is 0.0430 λRMS (a position of 0.3 mm).

TABLE 1

|  | Curvature Radius | Surface Interval | Glass Material Refractive Index |
| --- | --- | --- | --- |
| First Surface | −0.444 | 2.000 | 1.540 |
| Second Surface | −1.212 | 4.600 | — |
| Third Surface | 1.104 | 1.300 | 1.540 |
| Fourth Surface | −2.486 | 0.830 | — |
| Image Surface | ∞ | 0.420 | 1.574 |

TABLE 2

|  | K | $A_4$ | $A_6$ | $A_8$ | $A_{10}$ |
| --- | --- | --- | --- | --- | --- |
| First Surface Aspherical Surface | −4.340E−02 | −4.893E−03 | 0 | 0 | 0 |
| Second Surface Aspherical Surface | −2.554E−01 | 8.288E−04 | −3.266E−04 | 0 | 0 |
| Third Surface Aspherical Surface | −8.951E−01 | 2.459E−02 | 6.964E−03 | −9.180E−04 | 1.834E−03 |
| Fourth Surface Aspherical Surface | −3.693 | 1.410E−01 | −1.406E−01 | 7.787E−02 | −1.916E−02 |

TABLE 3

|  | Object Lens | Coupling Lens | Optical Pickup device |
| --- | --- | --- | --- |
| TT Length | 21.81 | −9.454 | 12.36 |
| Magnification | 0.090 | −1.616 | 0.146 |
| Focal Length | 1.620 | −15.14 | 0.579 |

In the optical pickup device 1 including such coupling lens 4 and object lens 5, it is possible to set the total track length short according to a structure of a finite system, reduce astigmatism, comatic aberration, and spherical aberration caused when visual field shake occurs, and realize a reduction in size in a state in which an optical characteristic is maintained.

In the optical pickup device 1 according to this embodiment, the finite optical system includes the coupling lens 4 as the divergence-angle converting lens that converts a light beam made incident thereon into a nonparallel state and emits the light beam and the object lens 5 corresponding to the coupling lens 4. Spherical aberration equivalent to an amount that can offset astigmatism caused when the object lens 5 is displaced in the tracking direction is given to the coupling lens 4. Spherical aberration that can offset the spherical aberration given to the coupling lens 4 is given to the object lens. In addition, comatic aberration that can offset comatic aberration caused by the spherical aberration given to the coupling lens 4 and the spherical aberration given to the object lens 5 itself when the object lens 5 is displaced is given to the object lens 5. Consequently, it is possible to reduce astigmatism, comatic aberration, and spherical aberration when visual field shake, which is a disadvantage of the finite system, occurs. It is possible to set a total track length short compared with that of an infinite optical system to realize a reduction in size in a state in which an optical characteristic is maintained.

Since the optical disk apparatus according to this embodiment includes the optical pickup device 1, it is possible to set a total track length short compared with the infinite optical system and realize a reduction in size of the apparatus in a state in which an optical characteristic is maintained.

It should be understood by those skilled in the art that various modifications, combinations, sub-combinations, and alterations may occur depending on design requirements and other factors insofar as they are within the scope of the appended claims or the equivalents thereof.

What is claimed is:

1. An optical pickup device comprising:
a light source that emits a light beam;
a divergence-angle converting lens that converts an angle of divergence of the light beam emitted from the light source and emits the light beam, the divergence-angle converting lens diverging divergent light emitted from the light source at a larger angle of divergence when the divergent light is made incident on a surface on an incidence side of the divergence-angle converting lens and emitting the divergent light at a predetermined angle of divergence when the divergent light is emitted from a surface on an emission side of the divergence-angle converting lens; and
an object lens adapted to be displaceable in a tracking direction that receives incidence of the light beam, the angle of divergence of which is converted by the divergence-angle converting lens, and converges and emits the light beam, wherein
spherical aberration equivalent to an amount that can offset astigmatism caused when the object lens is displaced is given to the divergence-angle converting lens, and
spherical aberration that can offset the spherical aberration given to the divergence-angle converting lens is given to the object lens and comatic aberration that can offset comatic aberration caused by the spherical aberration given to the divergence-angle converting lens when the object lens is displaced is given to the object lens.

2. An optical pickup device according to claim 1, wherein the surface on the incidence side on which light beam emitted from the light source of the divergence-angle converting lens is made incident and the surface on the emission side from which the light beam is emitted are formed in an aspherical shape.

3. An optical disk apparatus comprising:
an optical pickup device that records an information signal on and reproduces the information signal from an optical recording medium, the optical pickup device comprising:
a light source that emits a light beam;
a divergence-angle converting lens that converts an angle of divergence of the light beam emitted from the light source and emits the light beam, the divergence-angle converting lens diverging divergent light emitted from the light source at a larger angle of divergence when the divergent light is made incident on a surface on an incidence side of the divergence-angle converting lens and emitting the divergent light at a predetermined angle of divergence when the divergent light is emitted from a surface on an emission side of the divergence-angle converting lens; and
an object lens adapted to be displaceable in a tracking direction that receives incidence of the light beam, the angle of divergence of which is converted by the divergence-angle converting lens, and converges and emits the light beam, wherein
spherical aberration equivalent to an amount that can offset astigmatism caused when the object lens is displaced is given to the divergence-angle converting lens, and
spherical aberration that can offset the spherical aberration given to the divergence-angle converting lens is given to the object lens and comatic aberration that can offset comatic aberration caused by the spherical aberration given to the divergence-angle converting lens when the object lens is displaced is given to the object lens.

* * * * *